United States Patent
Benhase et al.

(10) Patent No.: US 8,453,157 B2
(45) Date of Patent: May 28, 2013

(54) THREAD SYNCHRONIZATION IN SIMULTANEOUS MULTI-THREADED PROCESSOR MACHINES

(75) Inventors: Michael Thomas Benhase, Tucson, AZ (US); Yu-Cheng Hsu, Tucson, AZ (US); John Norbert McCauley, Tucson, AZ (US); Louis Alonso Rasor, Tucson, AZ (US); William Griswold Sherman, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 2155 days.

(21) Appl. No.: 10/990,825

(22) Filed: Nov. 16, 2004

(65) Prior Publication Data
US 2006/0107263 A1    May 18, 2006

(51) Int. Cl.
*G06F 9/46*    (2006.01)
(52) U.S. Cl.
USPC .......................................................... 718/107
(58) Field of Classification Search
USPC ................................................ 718/104, 108
See application file for complete search history.

(56) References Cited

U.S. PATENT DOCUMENTS

| 5,371,848 | A  | * | 12/1994 | Casey et al. .................... 715/823 |
| 5,490,272 | A  |   | 2/1996  | Mathis et al. |
| 6,766,515 | B1 |   | 7/2004  | Bitar et al. |
| 7,496,918 | B1 | * | 2/2009  | Dice et al. ...................... 718/100 |
| 7,831,975 | B2 | * | 11/2010 | Ode .............................. 718/104 |
| 2002/0029239 | A1 |  | 3/2002 | Sullivan et al. |
| 2002/0078121 | A1 |  | 6/2002 | Ballantyne |
| 2002/0124241 | A1 |  | 9/2002 | Grey et al. |
| 2003/0041090 | A1 |  | 2/2003 | Armstrong et al. |
| 2003/0084269 | A1 |  | 5/2003 | Drysdale et al. |
| 2004/0093603 | A1 |  | 5/2004 | Alverson et al. |
| 2004/0123306 | A1 |  | 6/2004 | Gazda et al. |
| 2007/0028244 | A1 | * | 2/2007 | Landis et al. .................. 718/108 |

* cited by examiner

*Primary Examiner* — MengYao Zhe
*Assistant Examiner* — Eric C Wai
(74) *Attorney, Agent, or Firm* — Rabindranath Dutta; Raynes, Davda & Victor LLP (57) ABSTRACT

Provided are a method, system and article of manufacture, wherein a first application executes at least two threads corresponding to a simultaneous multi-threaded processor whose resources have been acquired by the first application. The at least two threads are synchronized before releasing the simultaneous multi-threaded processor to a second application.

20 Claims, 5 Drawing Sheets

THREAD SYNCHRONIZATION IN SIMULTANEOUS MULTI-THREADED PROCESSOR MACHINES

BACKGROUND

1. Field

The disclosure relates to a method, system, and article of manufacture for synchronizing threads in simultaneous multi-threaded processor machines.

2. Background

A simultaneous multi-threaded (SMT) processor may execute a plurality of instructions from a plurality of threads every processor cycle. SMT process design may implement hardware multi-threading with superscalar processor technology to allow a plurality of threads to issue instructions each processor cycle. Unlike many other hardware multi-threaded architectures, in which only a single hardware context (i.e., thread) is active on any given cycle, SMT process design may allow all thread contexts to simultaneously compete for and share the resources of a SMT processor. SMT machines may provide higher instruction throughput and program speedups for a variety of applications in both multiprogrammed and parallel environments, in comparison to non-SMT machines.

A SMT machine may include a plurality of SMT processors. The plurality of SMT processors may be used to process instructions caused by user applications that run on the SMT machine, where the user applications may execute in an operating environment provided by an operating system. A hypervisor is a program that provides access to SMT processors, memory, and other resources to the operating system, such that, the operating system can allow user applications to execute. The hypervisor has a higher privilege than the operating system may act as an interface between the operating system and the plurality of SMT processors.

SUMMARY OF THE DESCRIBED EMBODIMENTS

Provided are a method, system and article of manufacture, wherein a first application executes at least two threads corresponding to a simultaneous multi-threaded processor whose resources have been acquired by the first application. The at least two threads are synchronized before releasing the simultaneous multi-threaded processor to a second application.

In certain embodiments, the at least two threads are suspended subsequent to the synchronizing of the at least two threads, and prior to the releasing of the simultaneous multi-threaded processor.

In further embodiments, the second application has a higher privilege level than the first application, and the second application controls access to a plurality of simultaneous multi-threaded processors including the simultaneous multi-threaded processor. In additional embodiments, the first application is a driver implemented in an operating system, and the second application is a hypervisor for the plurality of simultaneous multi-threaded processor.

In yet additional embodiments, the first application acquires the resources of the simultaneous multi-threaded processor prior to the executing of the at least two threads. The at least two threads poll the second application to determine whether the second application needs the simultaneous multi-threaded processor for execution, prior to the synchronizing of the two threads. In further embodiments, the simultaneous multi-threaded processor is released to the second application. The second application completes execution on the simultaneous multi-threaded processor. The synchronized at least two threads continue to be executed, subsequent to the completion of the execution by the second application on the simultaneous multi-threaded processor.

In further embodiments, the simultaneous multi-threaded processor is included in a plurality of simultaneous multi-threaded processors that are controlled by the second application, wherein a plurality of sets of threads having a correspondence to the plurality of simultaneous multi-threaded processors are executed, wherein the at least two threads are included in a first set of threads, and wherein the first set of threads synchronize and release the simultaneous multi-threaded processor before a second set of threads. In additional embodiments, a first synchronization of the first set of threads is indicated, in response to a determination that the second application needs one simultaneous multi-threaded processor. A second synchronization of the second set of threads is initiated, in response to a determination that the second application needs the one simultaneous multi-threaded processor. The second synchronization is terminated in response to a completion of the first synchronization and the second set of threads continue execution.

In additional embodiments, the synchronizing of the at least two threads occur at a point where no locked resources are held by the at least two threads, and wherein the synchronizing prevents shared resources from being locked out by the simultaneous multi-threaded processor released to the second application.

In further embodiments, the at least two threads appear to the first application as if the two threads are being executed on independent processors, although the actual execution of the two threads is controlled by at least two hardware threads on the simultaneous multi-threaded processor.

In yet further embodiments, the at least two threads are software threads that correspond to at least two hardware threads of the simultaneous multi-threaded processor.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
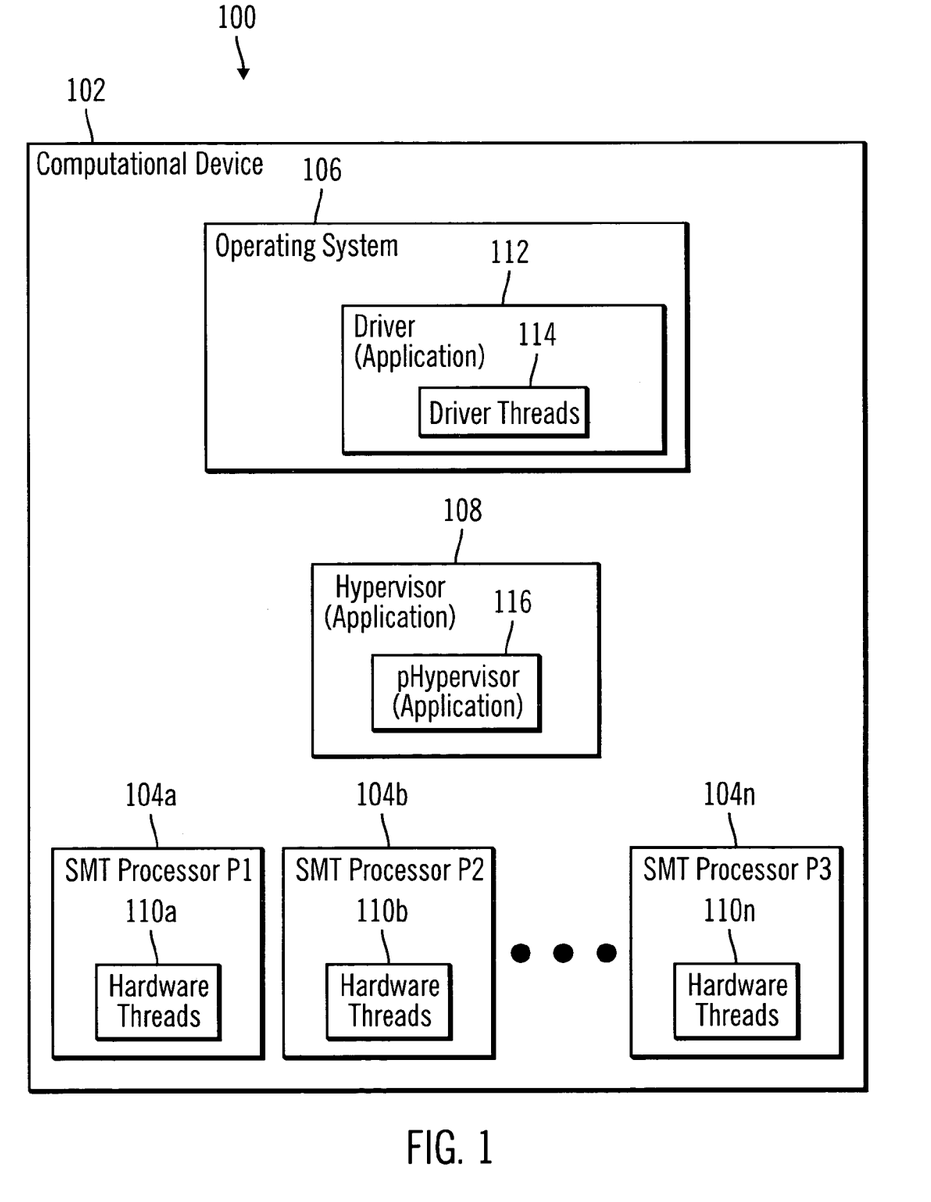
FIG. 1 illustrates a block diagram of a computing environment in accordance with certain embodiments.

FIG. 1 illustrates a block diagram of a computing environment 100 in accordance with certain embodiments. The computing environment 100 includes a computational device 102 that comprises a plurality of SMT processors 104a, 104b, . . . 104n, an operating system 106, and a hypervisor 108.

The computational device 102 may comprise any suitable computational device having a plurality of SMT processors, including those presently known in the art, such as, a server, a personal computer, a workstation, a mainframe, a midrange computer, a network appliance, a storage server, etc. In certain embodiments, the computational device 102 may also comprise other devices that are also capable of having a plurality of SMT processors, such as, a palm top computer, a telephony device, a blade computer, a hand held computer, etc. The computational device 102 may be deployed in the computing environment 100 as a node of a storage area network (SAN), a local area network (LAN), an Intranet, the Internet, etc.

The SMT processors 104a . . . 104n may each be capable of executing a plurality of hardware threads. For example, SMT Processor P1 (reference numeral 104a) may be capable of executing hardware threads 110a, SMT Processor P2 (reference numeral 104b) may be capable of executing hardware threads 110b, and SMT Processor P3 (reference numeral 104n) may be capable of executing hardware threads 110n. The hardware threads 110a, 110b, . . . , 110n use memory and processing units, such as, floating point units, integer units, etc., included in the SMT processors 104a . . . 104n. Each of the SMT processors may execute a plurality of instructions from a plurality of threads every cycle. However, if two threads executing in the same SMT processor share a common resource, then it is possible that both threads may not execute instructions that require the common resource in the same cycle. For example, in certain embodiments two hardware threads may not be able to use a floating point unit of a SMT processor in the same cycle. A SMT processor may in effect appear to the operating system 106 as a plurality of processors because of the plurality of hardware threads that are capable of executing in the SMT processor.

The operating system 106 is a supervisor program that allows user applications to execute in the computational device 102. The operating system 106 may be any suitable operating system that includes a suitable driver 112 that allows the operating system to use the resources of the SMT processors 104a . . . 104n provided by the hypervisor 108. The driver 112 is an application that is implemented for execution in the operating system 106. The driver 112 includes a plurality of driver threads 114, where there may be a driver thread corresponding to each hardware thread included in the hardware threads 110a . . . 110n of the SMT processors 104a . . . 104n.

The Hypervisor executes at a higher privilege level than the operating system 106, and provides the operating system with memory, processor, and other resources of the SMT processors 104a . . . 104n, in response to requirements of the operating system 106. The pHypervisor 116 application that executes in the Hypervisor 108 may provide certain of these resources, such as, memory, processor, etc., to the operating system 106. Therefore, in certain embodiments the hypervisor 106 in association with the pHypervisor 116 manages processor and memory resources of the SMT processors 104a . . . 104n for use by the operating system 106. The pHypervisor 116 runs at a privilege level higher than the operating system 106 and may be implemented in hardware, firmware, microcode or any combination thereof.

Therefore, FIG. 1 illustrates an embodiment in which a pHypervisor 116 manages a plurality of SMT processors 104a . . . 104n for use by the driver 112 of the operating system 106 that runs in the computational device 102.

Figure 2:
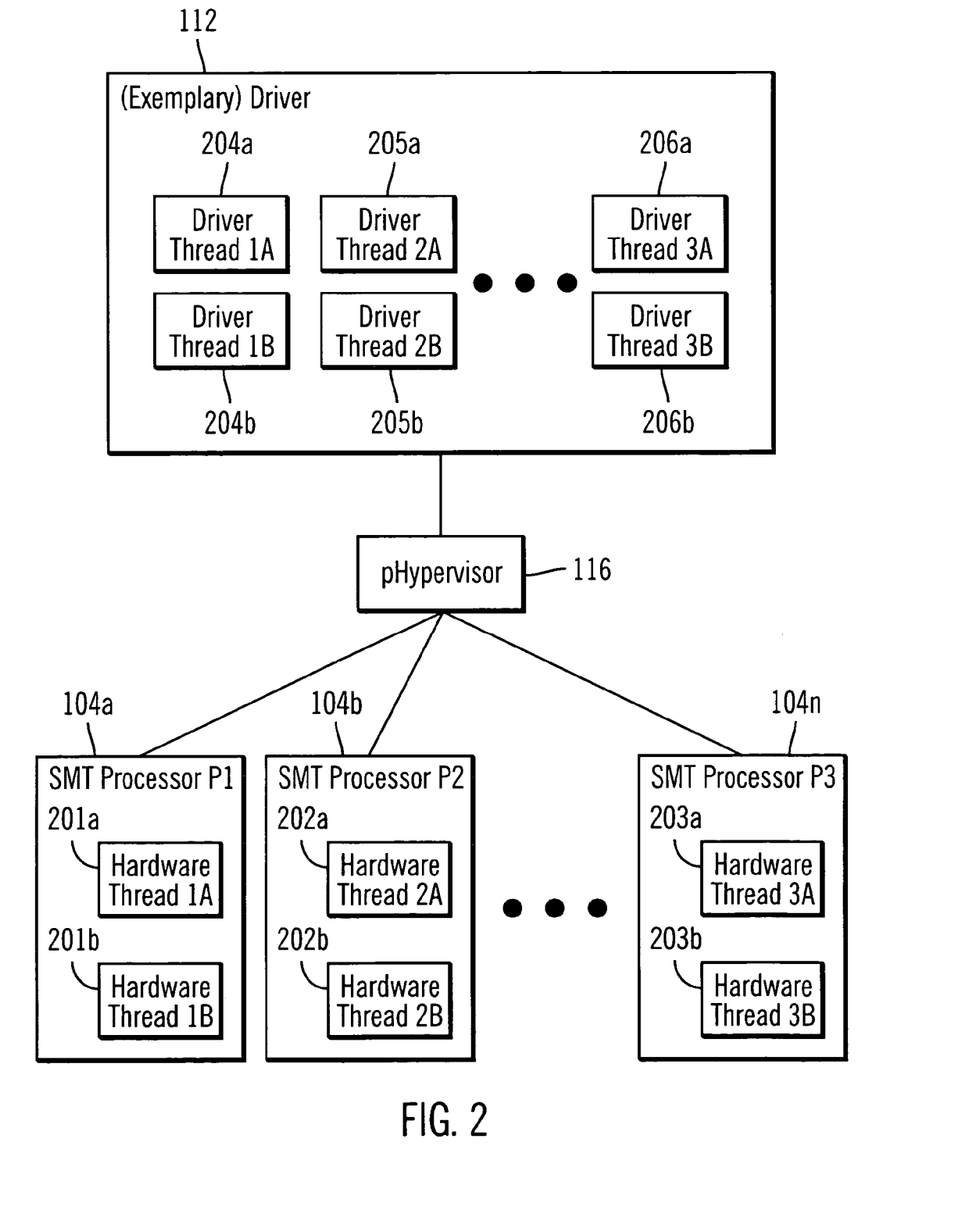
FIG. 2 illustrates a block diagram that shows how an exemplary driver interacts with a pHypervisor application that provides access to a plurality of SMT processors, in accordance with certain embodiments.

FIG. 2 illustrates a block diagram that shows how an exemplary driver 112 interacts with a pHypervisor 116 that provides access to a plurality of exemplary SMT processors 104a . . . 104n, in accordance with certain embodiments.

In an exemplary embodiment, the exemplary SMT processors 104a . . . 104n may each have two hardware threads capable of executing within an exemplary SMT processor. For example, hardware thread 1A (reference numeral 201a) and hardware thread 1B (reference numeral 201b) may execute in the exemplary SMT processor P1 (reference numeral 104a), hardware thread 2A (reference numeral 202a) and hardware thread 2B (reference numeral 202b) may execute in the exemplary SMT processor P2 (reference numeral 104b), and hardware thread 3A (reference numeral 203a) and hardware thread 3B (reference numeral 203b) may execute in the exemplary SMT processor P3 (reference numeral 104n). While the exemplary embodiment shows only two hardware threads per SMT processor in alternative embodiments there may be a greater number of hardware threads per SMT processor. Additionally different SMT processors may execute a different number of hardware threads.

Corresponding to a hardware thread in the SMT processors 104a . . . 104n there may be a driver thread in the exemplary driver 112. For example, corresponding to the two hardware threads 1A (reference numeral 201a) and 1B (reference numeral 201b) that execute in the processor P1 (reference numeral 104a) there may be two driver threads 1A (reference numeral 204a) and 1B (reference numeral 204b) that execute in the exemplary driver 112. Similarly corresponding to the two hardware threads 2A (reference numeral 202a), and 2B (reference numeral 202b) that execute in the processor P2 (reference numeral 104b) there may be two driver threads 2A (reference numeral 205a), 2B (reference numeral 205b) that execute in the exemplary driver 112, and corresponding to the two hardware threads 3A (reference numeral 203a), 3B (reference numeral 203b) that execute in the processor P3 (reference numeral 104n) there may be two driver threads 3A (reference numeral 206a), and 3B (reference numeral 206b) that execute in the exemplary driver 112.

The pair of driver threads corresponding to the pair of hardware threads for each SMT processor, allow the exemplary driver 112 to appear as if the exemplary driver 112 was processing operations on two simultaneously executing processors. For example, driver thread 1A (reference numeral 204a) and driver thread 1B (reference numeral 204b) may appear to run simultaneously on two different processors, although these driver threads 1A, 1B (reference numeral 204a, 204b) both use the resources of the same SMT processor P1 (reference numeral 104a).

However, in certain embodiments the pHypervisor 116 that provides the resources of the SMT processors 104a . . . 104n to the driver 112 may require processing time on a SMT processor. When the pHypervisor 116 executes on a selected SMT processor, the driver threads corresponding to the selected SMT processor cannot execute at the same time. For example, if the pHypervisor 116 executes on a selected SMT processor P2 (reference numeral 104b) then while the pHypervisor 116 is executing on the selected SMT processor P2 (reference numeral 104b) the driver threads 2A, 2B (reference numerals 205a, 205b) have to wait.

In certain embodiments, in response to the pHypervisor 116 requiring one SMT processor for execution, at least one pair of driver threads synchronize and release a SMT processor to the pHypervisor 116. After the pHypervisor 116 does not need the SMT processor any further, the synchronized driver threads can continue execution.

Therefore, FIG. 2 illustrates certain embodiments in which a pair of driver threads corresponding to a SMT processor synchronizes and waits till the SMT processor corresponding to the pair of driver threads is no longer required for execution by the pHypervisor 116. Synchronizing the driver threads prior to the release of the SMT processor to the pHypervisor 116 may prevent unnecessary waits for not suspended threads as a result of a suspended thread holding a lock, race conditions, etc., from occurring in the driver threads.

Figure 3:
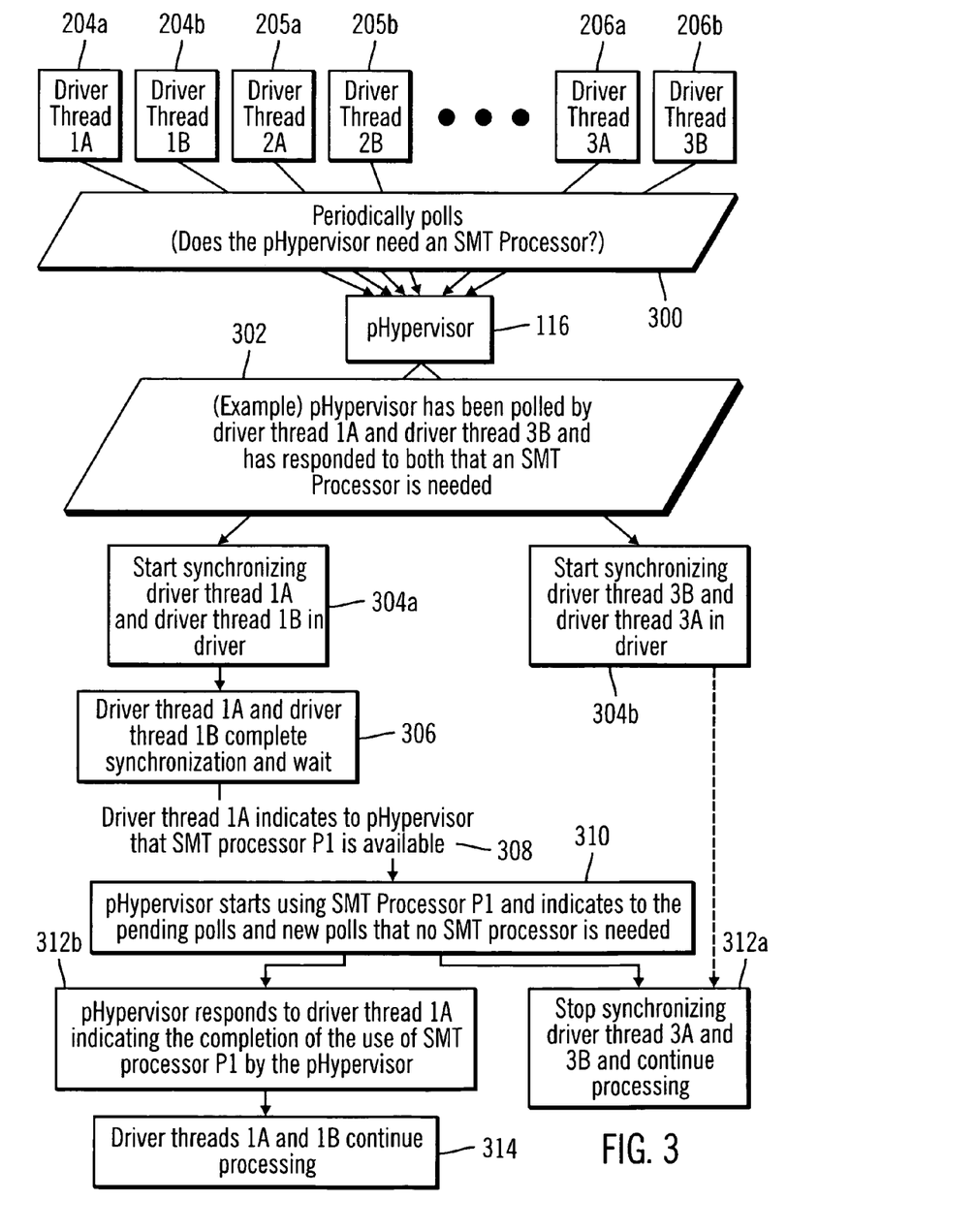
FIG. 3 illustrates a block diagram that shows how driver threads are synchronized in response to a need for SMT processing time for the pHypervisor application, in accordance with certain embodiments.

FIG. 3 illustrates a block diagram that shows how driver threads are synchronized in response to a need for SMT processing time for the pHypervisor 116, in accordance with certain embodiments.

In an exemplary embodiment, each of the driver threads 114 may periodically poll (reference numeral 300) the pHypervisor 116, where the polling attempts to determine whether the pHypervisor 116 needs an SMT processor. For example, driver threads 1A, 1B, 2A, 2B, 3A, 3B (references numerals 204a, 204b, 205a, 205b, 206a, 206b) may each periodically poll (reference numeral 300) the pHypervisor 116 at suitable intervals of time.

For example, in certain embodiments, the pHypervisor 116 may have been polled (reference numeral 302) by driver thread 1A (reference numeral 204a) and driver thread 3B (reference numeral 206b) and may have responded to both that a SMT processor is needed by the pHypervisor 116. In certain embodiments, any of the SMT processors 104a . . . 104n may be suitable for satisfying the processing need of the pHypervisor.

In certain embodiments, both driver threads 1A (reference numeral 204a) and driver thread 3B (reference numeral 206b) receive responses to the polling operations that indicate that the pHypervisor 116 needs a SMT processor. In response, the driver thread 1A (reference numeral 204a) starts (reference numeral 304a) synchronizing driver threads 1A and 1B (reference numerals 204a, 204b) so as to release the corresponding SMT processor P1 (reference numeral 104a) to the pHypervisor 116. Simultaneously, the driver thread 3B (reference numeral 206b) starts (reference numeral 304b) synchronizing driver threads 3A and 3B (reference numerals 206a, 206b) so as to release the corresponding SMT processor P3 (reference numeral 104n) to the pHypervisor 116. Therefore, if the pHypervisor 116 needs a SMT processor for processing, a plurality of driver thread pairs may attempt to release a SMT processor for the pHypervisor 116 as soon as possible, without at the same time causing race conditions, unnecessary waits, etc., in the executing driver threads.

In certain embodiments, driver threads 1A and 1B (reference numerals 204a, 204b) complete (reference numeral 306) synchronization before driver threads 3B and 3A (reference numerals 206b, 206a) complete synchronization. In such a case, driver thread 1A (reference numeral 204a) that received a response to the polling operations indicates (reference numeral 308) to the pHypervisor 116 that SMT Processor P1 (reference numeral 104a) is available for processing.

The pHypervisor 116 starts (reference numeral 310) processing operations on the SMT processor P1 (reference numeral 104a) and indicates to all new and pending pollers, i.e., driver threads, that no further SMT processor is needed. The driver threads 3A and 3B (reference numeral 206a, 206b) stop (reference numeral 312a) the synchronization process and both continue processing by using the SMT processor P3 (reference numeral 104n). The pHypervisor 116 may also respond (reference numeral 312b) to driver thread 1A (reference numeral 204a) indicating the completion of the use of SMT processor P1 (reference numeral 104a) by the pHypervisor 116.

On receiving a response from the pHypervisor 116 that indicates the completion of the use of the SMT processor P1 (reference numeral 104a), the driver threads 1A and 1B (reference numerals 204a, 204b) continue processing.

Therefore, FIG. 3 illustrates certain embodiments in which in response to the need for one SMT processor for processing by the pHypervisor 116, at least one pair of driver threads that uses the resources of a SMT processor, releases the SMT processor to the pHypervisor 116 after synchronizing the individual threads of the at least one pair of driver threads.

Figure 4:
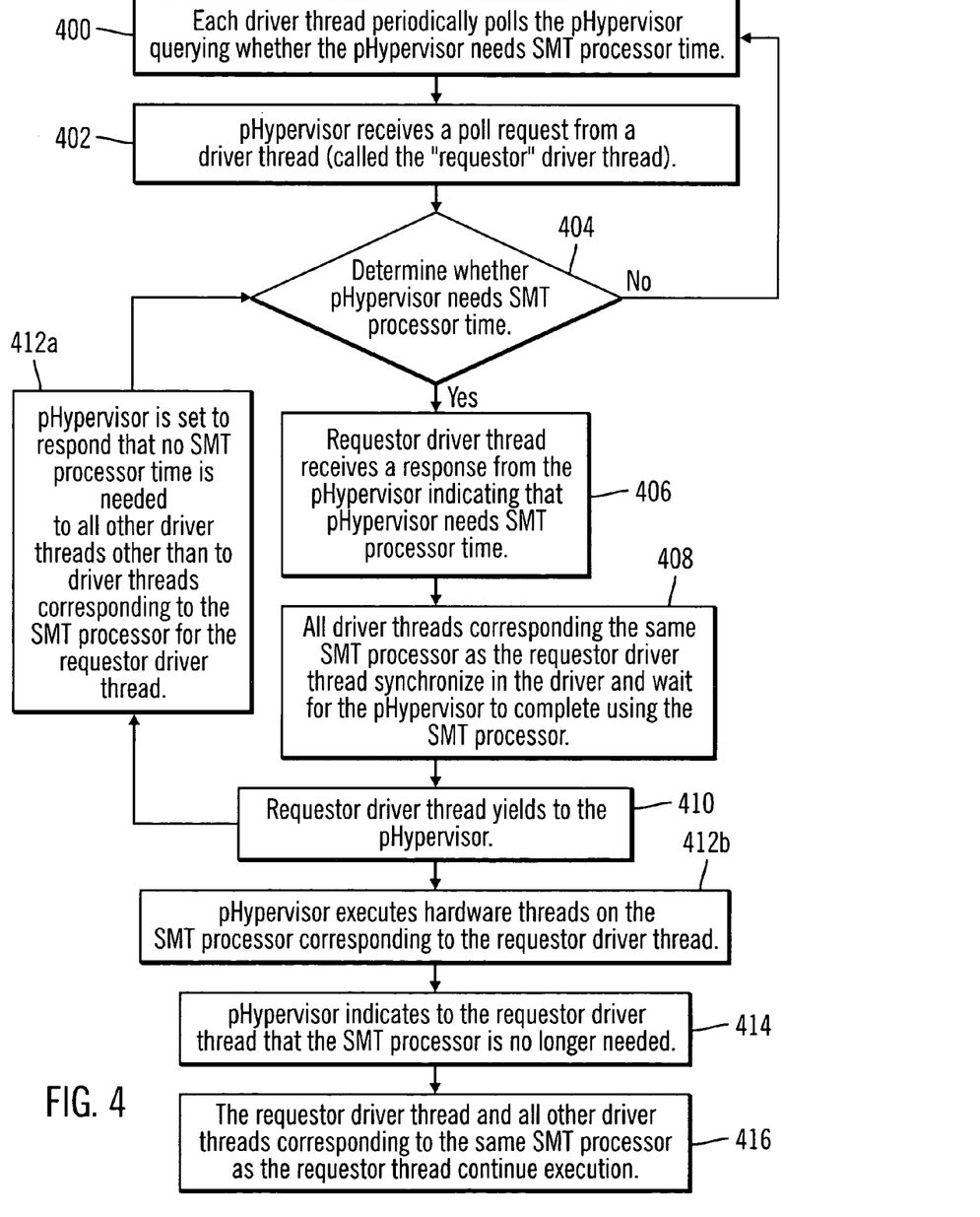
FIG. 4 illustrates operations for synchronizing driver threads in response to a need for SMT processing time for the pHypervisor application, in accordance with certain embodiments.

FIG. 4 illustrates operations for synchronizing driver threads in response to a need for SMT processing time for the pHypervisor 116, in accordance with certain embodiments. The operations described in FIG. 4 may be implemented in the pHypervisor 116 and the driver threads 114.

Control starts at block 400, where each driver thread of the plurality of driver threads 114 periodically polls the pHypervisor 116 and queries the pHypervisor 116 as to whether the pHypervisor 116 needs SMT processor time.

The pHypervisor 116 receives (at block 402) a poll request from a driver thread. The driver thread from which the pHypervisor 116 receives the poll request may be referred to as the "requester" driver thread. The pHypervisor 116 may receive poll requests from a plurality of "requester" drive threads.

The pHypervisor 116 determines (at block 404) whether the pHypervisor 116 needs SMT processor time. If not, control returns to block 400. If the pHypervisor 116 needs SMT processing time, then the corresponding "requestor" driver thread receives (at block 406) a response from the pHypervisor 116 indicating the need for SMT processing time for the pHypervisor 116.

All driver threads that correspond to the same SMT processor as the "requester" driver thread synchronize (at block 408) in the driver 112 and wait for the pHypervisor 116 to complete using the SMT processor. It is possible that other "requestor" driver threads are also attempting to complete synchronization in parallel.

The "requestor" driver thread yields (at block 410) the SMT processor corresponding to the driver thread to the pHypervisor 116. For example, the driver thread 1A (reference numeral 204a) may synchronize with driver thread 1B (reference numeral 204b) and yield the SMT processor P1 (reference numeral 104a) to the pHypervisor 116. The pHypervisor 116 is set (at block 412a) to respond that no SMT processor time is needed to all driver threads other than the driver threads that have yielded the SMT processor. In parallel to block 412a, the pHypervisor 116 executes (at block 412b) hardware threads on the yielded SMT processor corresponding to the "requester" driver thread.

After completing execution on the yielded SMT processor, the pHypervisor 116 indicates (at block 414) to the "requestor" driver thread that the yielded SMT processor is no longer needed. The "requestor" driver thread and all other driver threads corresponding to the yielded SMT processor continue (at block 416) execution. Since the "requestor" driver thread and all other driver threads corresponding to the yielded SMT processors were synchronized before yielding the processor, there are no race conditions, execution order errors, unnecessary waits for not suspended threads as a result of a suspended driver thread holding a lock, etc., among the driver threads.

Therefore, FIG. 4 illustrates certain embodiments in which a pHypervisor 116 that requires processing time on a SMT processor, is yielded one SMT processor after synchronizing driver threads that corresponds to the yielded SMT processor. The driver threads execute in parallel as if there are a plurality of processors corresponding to each SMT processor. However, when the pHypervisor 116 needs a SMT processor, the SMT processor is provided exclusively to the pHypervisor 116 for processing only after the driver threads corresponding to the SMT processor have synchronized.

In certain embodiments, in a SMT environment a plurality are threads are presented to the operating system from a single central processing unit (CPU) core of a SMT processor. Logically the plurality of threads appear as if the plurality of threads are executing on independent processors. The plurality of threads do not suspend execution arbitrarily when an SMT processor is yielded to the pHypervisor 116. The plurality of threads are synchronized before a SMT processor is deliberately yielded to the Hypervisor 116. Since locks on resources are released in synchronized threads, other threads that continue to execute do no wait unnecessarily for locked resources.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 5:
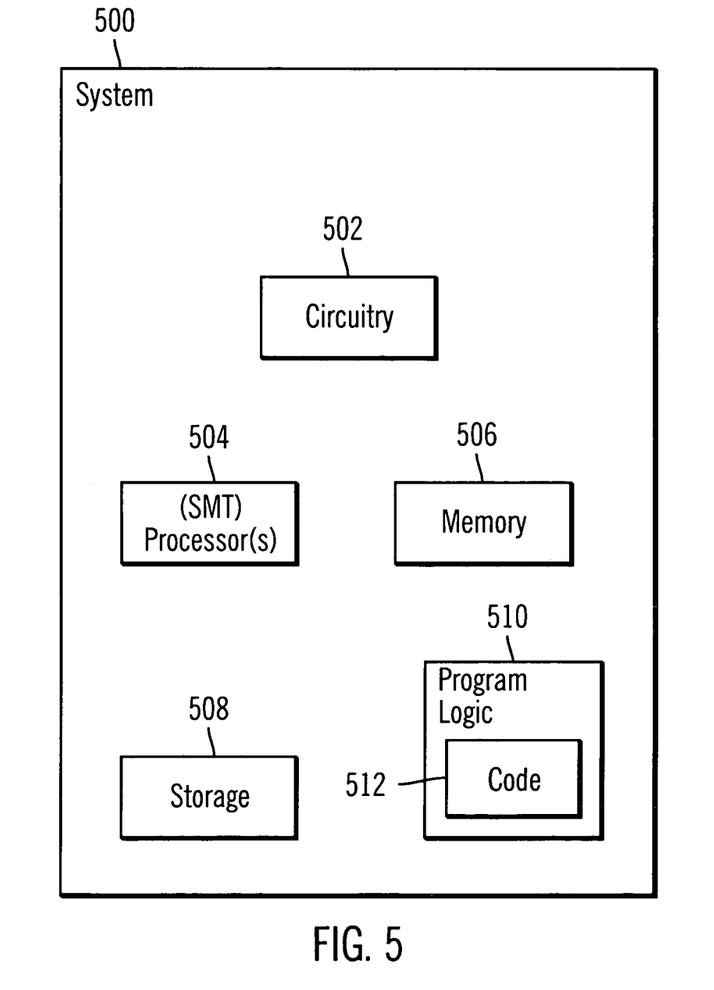
FIG. 5 illustrates a system in which certain embodiments are implemented.

FIG. 5 illustrates a block diagram of a system 500 in which certain embodiments may be implemented. In certain embodiments, the computational device 102 may be implemented in accordance with the system 500. The system 500 may include a circuitry 502 that may in certain embodiments include a processor 504. The system 500 may also include a memory 506 (e.g., a volatile memory device), and storage 508. Certain elements of the system 500 may or may not be found in the computational device 102. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 (such, as any of the SMT processors 104a . . . 104n) or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:
1. A method, comprising:
executing by a first application in a computational device having a plurality of simultaneous multi-threaded (SMT) processors, a first driver thread and a second driver thread that use resources of a first SMT processor of the plurality of SMT processors, and a third driver thread and a fourth driver thread that use resources of a second SMT processor of the plurality of processors;
polling periodically by the first driver thread, the second driver thread, the third driver thread, and the fourth driver thread, to determine whether a second application needs to execute on at least one of the plurality of SMT processors, wherein the first driver thread, the second driver thread, the third driver thread, and the fourth driver poll the second application at different times;
while polling periodically, starting synchronization of the first driver thread and the second driver thread, in response to determining by the first driver thread that the second application needs one of the plurality of SMT processors for execution;
while polling periodically, also starting synchronization of the third driver thread and the fourth driver thread, in response to determining by the third driver thread that the second application needs one of the plurality of SMT processors for execution;

determining whether the first driver thread and the second driver thread complete synchronization prior to the third driver thread and the fourth driver thread, or whether the third driver thread and the fourth driver thread complete synchronization prior to the first driver thread and the second driver thread;

completing synchronization of the first driver thread and the second driver thread while the third driver thread and the fourth driver thread have not completed synchronization;

receiving, an indication by the second application, from the first driver thread that the first SMT processor is available, in response to completing synchronization of the first driver thread and the second driver thread;

in response to receiving the indication by the second application, executing, the second application on the first SMT processor while the first driver thread and the second driver thread waits, and indicating in response to pending polls and new polls that no SMT processor is needed by the second application; and in response to the executing of the second application on the first SMT processor, stopping synchronization of the third driver thread and the fourth driver thread, and continuing execution of the third driver thread and the fourth driver thread.

2. The method of claim 1, wherein:
the first application is an operating system; and
the second application is a hypervisor that has a higher privilege level than the operating system, wherein the hypervisor provides resources of the first SMT processor and the second SMT processor to the operating system.

3. The method of claim 2, wherein the first driver thread, the second driver thread, the third driver thread, and the fourth driver thread are included in a plurality of driver threads that are executed by the operating system, wherein if the hypervisor needs to execute on any one of the plurality of SMT processors, then at least one of the plurality of SMT processors has to be released by at least one of the plurality of driver threads.

4. The method of claim 3, wherein while polling periodically, each driver thread of the plurality of driver threads polls the second application at a different time.

5. The method of claim 4, the method further comprising:
completing execution of the second application on the first SMT processor;
in response to completing the execution of the second application on the first SMT processor, sending a response by the second application to the first driver thread that that the second application has completed use of the first SMT processor; and
continuing execution on the first SMT processor, of the first driver thread and the second driver thread, subsequent to receiving the response by the first driver thread that that the second application has completed use of the first SMT processor.

6. A system, comprising:
a memory;
a plurality of simultaneous multi-threaded (SMT) processors coupled to the memory; and
circuitry coupled to the memory, wherein the circuitry is capable of performing operations, the operations comprising:
executing by a first application, a first driver thread and a second driver thread that use resources of a first SMT processor of the plurality of SMT processors, and a third driver thread and a fourth driver thread that use resources of a second SMT processor of the plurality of processors;

polling periodically by the first driver thread, the second driver thread, the third driver thread, and the fourth driver thread, to determine whether a second application needs to execute on at least one of the plurality of SMT processors, wherein the first driver thread, the second driver thread, the third driver thread, and the fourth driver poll the second application at different times;

while polling periodically, starting synchronization of the first driver thread and the second driver thread, in response to determining by the first driver thread that the second application needs one of the plurality of SMT processors for execution;

while polling periodically, also starting synchronization of the third driver thread and the fourth driver thread, in response to determining by the third driver thread that the second application needs one of the plurality of SMT processors for execution;

determining whether the first driver thread and the second driver thread complete synchronization prior to the third driver thread and the fourth driver thread, or whether the third driver thread and the fourth driver thread complete synchronization prior to the first driver thread and the second driver thread;

completing synchronization of the first driver thread and the second driver thread while the third driver thread and the fourth driver thread have not completed synchronization;

receiving, an indication by the second application, from the first driver thread that the first SMT processor is available, in response to completing synchronization of the first driver thread and the second driver thread;

in response to receiving the indication by the second application, executing, the second application on the first SMT processor while the first driver thread and the second driver thread waits, and indicating in response to pending polls and new polls that no SMT processor is needed by the second application; and in response to the executing of the second application on the first SMT processor, stopping synchronization of the third driver thread and the fourth driver thread, and continuing execution of the third driver thread and the fourth driver thread.

7. The system of claim 6, wherein:
the first application is an operating system; and
the second application is a hypervisor that has a higher privilege level than the operating system, wherein the hypervisor provides resources of the first SMT processor and the second SMT processor to the operating system.

8. The system of claim 7, wherein the first driver thread, the second driver thread, the third driver thread, and the fourth driver thread are included in a plurality of driver threads that are executed by the operating system, wherein if the hypervisor needs to execute on any one of the plurality of SMT processors, then at least one of the plurality of SMT processors has to be released by at least one of the plurality of driver threads.

9. The system of claim 8, wherein while polling periodically, each driver thread of the plurality of driver threads polls the second application at a different time.

10. The system of claim 9, the operations further comprising:
completing execution of the second application on the first SMT processor;

in response to completing the execution of the second application on the first SMT processor, sending a response by the second application to the first driver thread that that the second application has completed use of the first SMT processor; and continuing execution on the first SMT processor, of the first driver thread and the second driver thread, subsequent to receiving the response by the first driver thread that that the second application has completed use of the first SMT processor.

11. A storage device, wherein code stored in the storage device when executed by a computational device having a plurality of simultaneous multi-threaded (SMT) processors causes operations, the operations comprising:

executing by a first application in the computational device having the plurality of SMT processors, a first driver thread and a second driver thread that use resources of a first SMT processor of the plurality of SMT processors, and a third driver thread and a fourth driver thread that use resources of a second SMT processor of the plurality of processors;

polling periodically by the first driver thread, the second driver thread, the third driver thread, and the fourth driver thread, to determine whether a second application needs to execute on at least one of the plurality of SMT processors, wherein the first driver thread, the second driver thread, the third driver thread, and the fourth driver poll the second application at different times;

while polling periodically, starting synchronization of the first driver thread and the second driver thread, in response to determining by the first driver thread that the second application needs one of the plurality of SMT processors for execution;

while polling periodically, also starting synchronization of the third driver thread and the fourth driver thread, in response to determining by the third driver thread that the second application needs one of the plurality of SMT processors for execution;

determining whether the first driver thread and the second driver thread complete synchronization prior to the third driver thread and the fourth driver thread, or whether the third driver thread and the fourth driver thread complete synchronization prior to the first driver thread and the second driver thread;

completing synchronization of the first driver thread and the second driver thread while the third driver thread and the fourth driver thread have not completed synchronization;

receiving, an indication by the second application, from the first driver thread that the first SMT processor is available, in response to completing synchronization of the first driver thread and the second driver thread;

in response to receiving the indication by the second application, executing, the second application on the first SMT processor while the first driver thread and the second driver thread waits, and indicating in response to pending polls and new polls that no SMT processor is needed by the second application; and in response to the executing of the second application on the first SMT processor, stopping synchronization of the third driver thread and the fourth driver thread, and continuing execution of the third driver thread and the fourth driver thread.

12. The storage device of claim 11, wherein:
the first application is an operating system; and
the second application is a hypervisor that has a higher privilege level than the operating system, wherein the hypervisor provides resources of the first SMT processor and the second SMT processor to the operating system.

13. The storage device of claim 12, wherein the first driver thread, the second driver thread, the third driver thread, and the fourth driver thread are included in a plurality of driver threads that are executed by the operating system, wherein if the hypervisor needs to execute on any one of the plurality of SMT processors, then at least one of the plurality of SMT processors has to be released by at least one of the plurality of driver threads.

14. The storage device of claim 13, wherein while polling periodically, each driver thread of the plurality of driver threads polls the second application at a different time.

15. The storage device of claim 14, the operations further comprising:

completing execution of the second application on the first SMT processor;

in response to completing the execution of the second application on the first SMT processor, sending a response by the second application to the first driver thread that that the second application has completed use of the first SMT processor; and continuing execution on the first SMT processor, of the first driver thread and the second driver thread, subsequent to receiving the response by the first driver thread that that the second application has completed use of the first SMT processor.

16. A method for deploying computing infrastructure, comprising integrating computer-readable code into a computational device having a plurality of SMT processors, wherein the code in combination with the computing system performs:

executing by a first application in the computational device having the plurality of SMT processors, a first driver thread and a second driver thread that use resources of a first SMT processor of the plurality of SMT processors, and a third driver thread and a fourth driver thread that use resources of a second SMT processor of the plurality of processors;

polling periodically by the first driver thread, the second driver thread, the third driver thread, and the fourth driver thread, to determine whether a second application needs to execute on at least one of the plurality of SMT processors, wherein the first driver thread, the second driver thread, the third driver thread, and the fourth driver poll the second application at different times;

while polling periodically, starting synchronization of the first driver thread and the second driver thread, in response to determining by the first driver thread that the second application needs one of the plurality of SMT processors for execution;

while polling periodically, also starting synchronization of the third driver thread and the fourth driver thread, in response to determining by the third driver thread that the second application needs one of the plurality of SMT processors for execution;

determining whether the first driver thread and the second driver thread complete synchronization prior to the third driver thread and the fourth driver thread, or whether the third driver thread and the fourth driver thread complete synchronization prior to the first driver thread and the second driver thread;

completing synchronization of the first driver thread and the second driver thread while the third driver thread and the fourth driver thread have not completed synchronization;

receiving, an indication by the second application, from the first driver thread that the first SMT processor is available, in response to completing synchronization of the first driver thread and the second driver thread;

in response to receiving the indication by the second application, executing, the second application on the first SMT processor while the first driver thread and the second driver thread waits, and indicating in response to pending polls and new polls that no SMT processor is needed by the second application; and in response to the executing of the second application on the first SMT processor, stopping synchronization of the third driver thread and the fourth driver thread, and continuing execution of the third driver thread and the fourth driver thread.

17. The method for deploying computing infrastructure of claim 16, wherein:

the first application is an operating system; and the second application is a hypervisor that has a higher privilege level than the operating system, wherein the hypervisor provides resources of the first SMT processor and the second SMT processor to the operating system.

18. The method for deploying computing infrastructure of claim 17, wherein the first driver thread, the second driver thread, the third driver thread, and the fourth driver thread are included in a plurality of driver threads that are executed by the operating system, wherein if the hypervisor needs to execute on any one of the plurality of SMT processors, then at least one of the plurality of SMT processors has to be released by at least one of the plurality of driver threads.

19. The method for deploying computing infrastructure of claim 18, wherein while polling periodically, each driver thread of the plurality of driver threads polls the second application at a different time.

20. The method for deploying computing infrastructure of claim 19, the operations further comprising:

completing execution of the second application on the first SMT processor;

in response to completing the execution of the second application on the first SMT processor, sending a response by the second application to the first driver thread that that the second application has completed use of the first SMT processor; and continuing execution on the first SMT processor, of the first driver thread and the second driver thread, subsequent to receiving the response by the first driver thread that that the second application has completed use of the first SMT processor.

* * * * *